United States Patent

Tadokoro et al.

[19]

[11] Patent Number: 5,974,203
[45] Date of Patent: Oct. 26, 1999

[54] PATTERN RECOGNITION COMMUNICATION APPARATUS FOR TRANSMITTING AND RECEIVING IMAGE DATA

[75] Inventors: Yoshihisa Tadokoro, Yokohama; Toshiaki Saito, Tokyo, both of Japan

[73] Assignee: Canon Kabushiki Kaisha, Tokyo, Japan

[21] Appl. No.: 08/380,331

[22] Filed: Jan. 30, 1995

Related U.S. Application Data

[63] Continuation of application No. 08/100,206, Aug. 2, 1993, abandoned, which is a continuation of application No. 07/812,855, Dec. 23, 1991, abandoned, which is a continuation of application No. 07/334,432, Apr. 7, 1989, abandoned.

[30] Foreign Application Priority Data

| Apr. 11, 1988 | [JP] | Japan | 63-087122 |
| Jun. 22, 1988 | [JP] | Japan | 63-152269 |

[51] Int. Cl.⁶ .................................................. G06K 9/03
[52] U.S. Cl. ............................................ 382/309; 358/405
[58] Field of Search ...................................... 382/309, 317, 382/177, 310, 311; 358/405

[56] References Cited

U.S. PATENT DOCUMENTS

| 3,181,119 | 4/1965 | Rabinow ................................. 382/57 |
| 3,806,871 | 4/1974 | Shepard ............................ 340/146.3 H |
| 3,848,228 | 11/1974 | MacNeill ........................... 340/146.3 F |
| 4,068,212 | 1/1978 | Templeton ...................... 340/146.3 ED |
| 4,566,039 | 1/1986 | Oya .......................................... 358/280 |
| 4,727,429 | 2/1988 | Ueno ......................................... 358/405 |
| 4,747,058 | 5/1988 | Ho ............................................. 364/478 |
| 4,914,709 | 4/1990 | Rudak ....................................... 382/310 |
| 4,974,260 | 11/1990 | Rudak ....................................... 382/310 |
| 5,018,022 | 5/1991 | Tatsumi .................................... 358/405 |
| 5,140,439 | 8/1992 | Tanaka ..................................... 358/405 |
| 5,216,517 | 6/1993 | Kinoshita et al. ....................... 358/405 |
| 5,233,672 | 8/1993 | Yamanari et al. ....................... 382/310 |
| 5,337,370 | 8/1994 | Gilles et al. ............................. 382/224 |
| 5,390,259 | 2/1995 | Withgott et al. ........................ 382/173 |
| 5,671,156 | 9/1997 | Weerackody et al. .............. 365/514 R |

FOREIGN PATENT DOCUMENTS

| 57-191784 | 11/1982 | Japan ...................................... 382/311 |
| 59-32068 | 2/1984 | Japan ...................................... 382/311 |
| 59-32069 | 2/1984 | Japan ...................................... 382/311 |
| 59-32070 | 2/1984 | Japan ...................................... 382/311 |

*Primary Examiner*—Andrew W. Johns
*Attorney, Agent, or Firm*—Fitzpatrick, Cella, Harper & Scinto

[57] ABSTRACT

A communicating apparatus to communicate image data such as in a facsimile apparatus comprises: a receiving circuit to receive image information from a distant side terminal; a recognition section to perform the character recognition on the basis of the received information from the receiving circuit; and a transmitting circuit to transmit an abnormal reception signal to the distant side terminal when the recognition by the recognition section cannot be executed. The recognition section discriminates whether the received image information has been obtained by reading an OCR sheet or not. When an unrecognizable character exists on a received document, the unrecognizable character position, the result of the recognition, an abnormal reception signal, the input image data, and a request for retransmission of the image data are sent back from the distant side terminal to the transmitting side apparatus, so that the image data can be automatically retransmitted therefrom by the simple operation.

30 Claims, 7 Drawing Sheets

PATTERN RECOGNITION COMMUNICATION APPARATUS FOR TRANSMITTING AND RECEIVING IMAGE DATA

This application is a continuation of application Ser. No. 08/100,206 filed Aug. 2, 1993, now abandoned which is a continuation of application Ser. No. 07/812,855 filed Dec. 23, 1991, now abandoned, which is a continuation of application Ser. No. 07/334,432 filed Apr. 7, 1989, now abandoned.

BACKGROUND OF THE INVENTION

1. Field of the Invention

The present invention relates to a communicating apparatus to communicate image data.

2. Related Background Art

Hitherto, a facsimile apparatus receives a document from a distance side terminal and sends back a normal reception signal on a transmission control procedure to the transmitting side terminal when it is determined from the received document that a deterioration in the image which is caused depending on the quality of a telephone line network or the like lies within a reference decision range.

On the other hand, there has also been proposed an apparatus which receives not only a normal document but also a hand written character document (OCR document) and provides various services. In such an apparatus, the normal document and the OCR document are discriminated and in the case of the OCR document, the pattern recognition is executed and even if the result of the recognition denotes that the document cannot be recognized as characters, a normal reception signal on the transmission control procedure is sent back to the transmitting side terminal.

As mentioned above, in the conventional apparatus, when the deterioration in image which is caused depending on the quality of the telephone line network or the like lies within a reference decision range, the normal reception signal is sent back to the transmitting side terminal. However, as mentioned above, a check is made to see if the received document is the OCR document or not and in the case of the OCR document, the apparatus operates so as to recognize characters with respect to the received document. Therefore, if even one character on the received document cannot be recognized, the received document becomes quite meaningless. In such a case, the operator on the receiving side calls the transmitting side by using a telephone and requests for the transmitting side to again transmit the document.

SUMMARY OF THE INVENTION

In consideration of the above points, it is an object of the present invention to provide a communicating apparatus in which a pattern recognizing process is executed for a received document and in the case where the received document cannot be recognized, a request for the retransmission is sent.

In consideration of the foregoing points, another object of the invention is to provide a communicating apparatus in which a pattern recognizing process is executed for a received document and in the case where the received document cannot be recognized, a request for retransmission including unrecognizable position information is sent.

DETAILED DESCRIPTION OF THE PREFERRED EMBODIMENTS

A preferred embodiment of the present invention will be described in detail hereinbelow with reference to the drawings.

I. [Description of the Apparatus (FIG. 1)]

Figure 1:
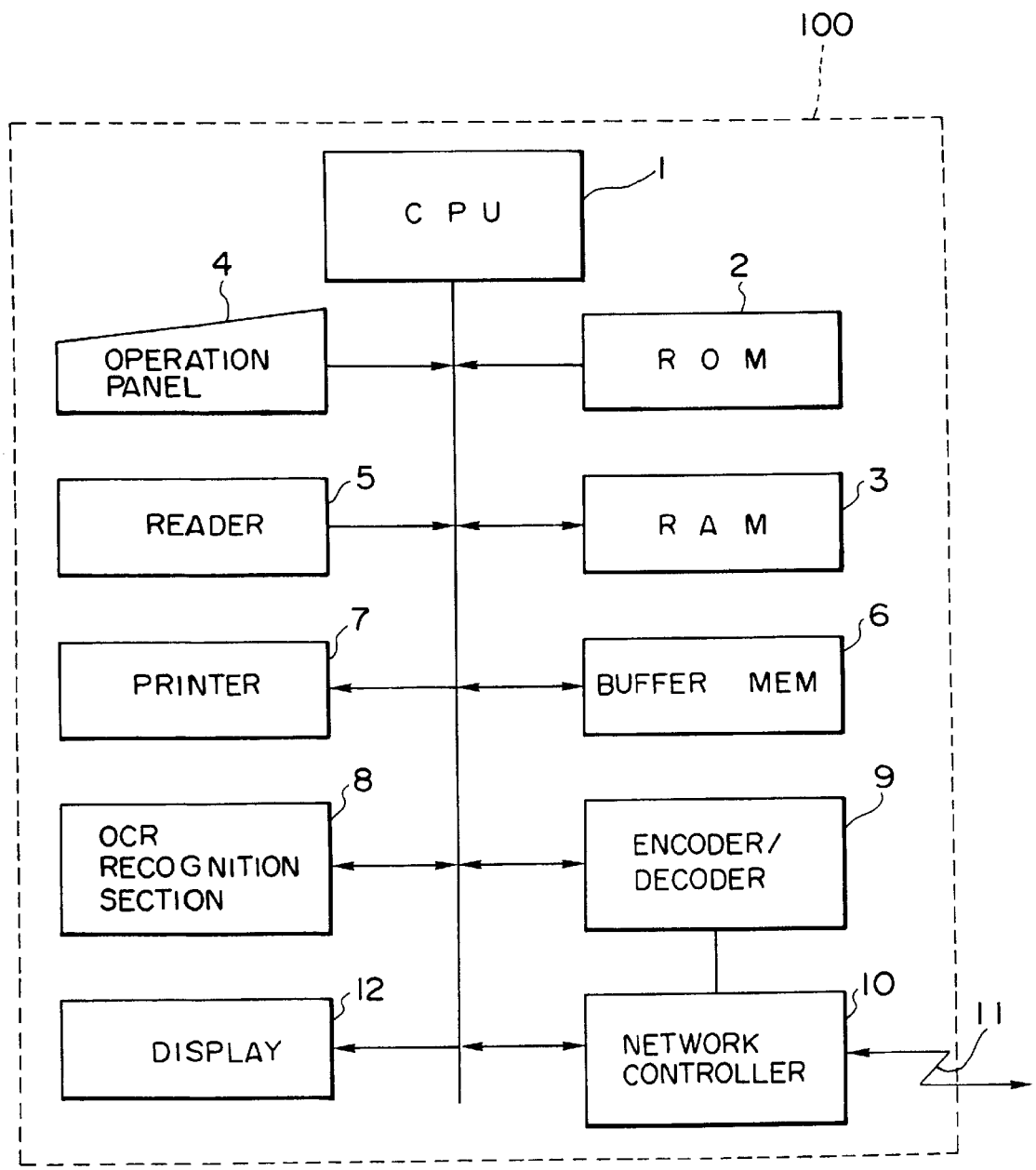
FIG. 1 is a block diagram of a facsimile apparatus in an embodiment.

FIG. 1 is a block diagram of a facsimile apparatus according to the embodiment.

In the diagram, reference numeral 1 denotes a CPU to control the whole apparatus and 2 indicates an ROM in which a processing procedure (program) of the CPU 1 and character font patterns are stored. A program regarding FIG. 3, which will be explained hereinlater, is included in the ROM 2. Reference numeral 3 denotes an RAM which is used as a work area of the CPU 1; 4 indicates an operation panel which is used to input the telephone number on the distance side in the case of transmitting an image and the input telephone number is displayed on a display 12; 5 is a reader to read a document image to be transmitted; 6 a buffer memory to store the document image which was read by the reader 5 and the image data which was received from the distant terminal; 7 a printer to print the received document image; 8 an OCR recognition section for recognizing the normal document and the OCR document and for performing the OCR analysis; and 9 an encoder/decoder for compressing and encoding the document image stored into the buffer memory 6 upon transmission and for decoding the compressed and encoded image data upon reception. Reference numeral 10 denotes a network controller to control the connection between the apparatus and a public line 11. The transmission and reception of the encoded image data are executed through the network controller 10.

For instance, when a signal is received from the distant side facsimile apparatus through the public line 11, the network controller 10 detects the signal reception and sends back a response signal in accordance with the facsimile transmission control procedure. In response to the response signal sent, a set instruction signal and a phase signal are transmitted from the distant side facsimile apparatus. At this time, the network controller 10 receives those signals and sets the operating mode and executes the phase matching process. If the image data can be received, the network controller 10 sends a reception preparation completion signal. Thereafter, when the encoded image data is received and the image data end signal is finally received, the end of reception of the image data is informed to the CPU 1. Next, the CPU 1 activates the encoder/decoder 9 and waits for the completion of the decoding of the received image data. On the other hand, the activated encoder/decoder 9 decodes the received image data and, at the same time, decides the quality of image and informs the result to the CPU 1.

Figure 2:
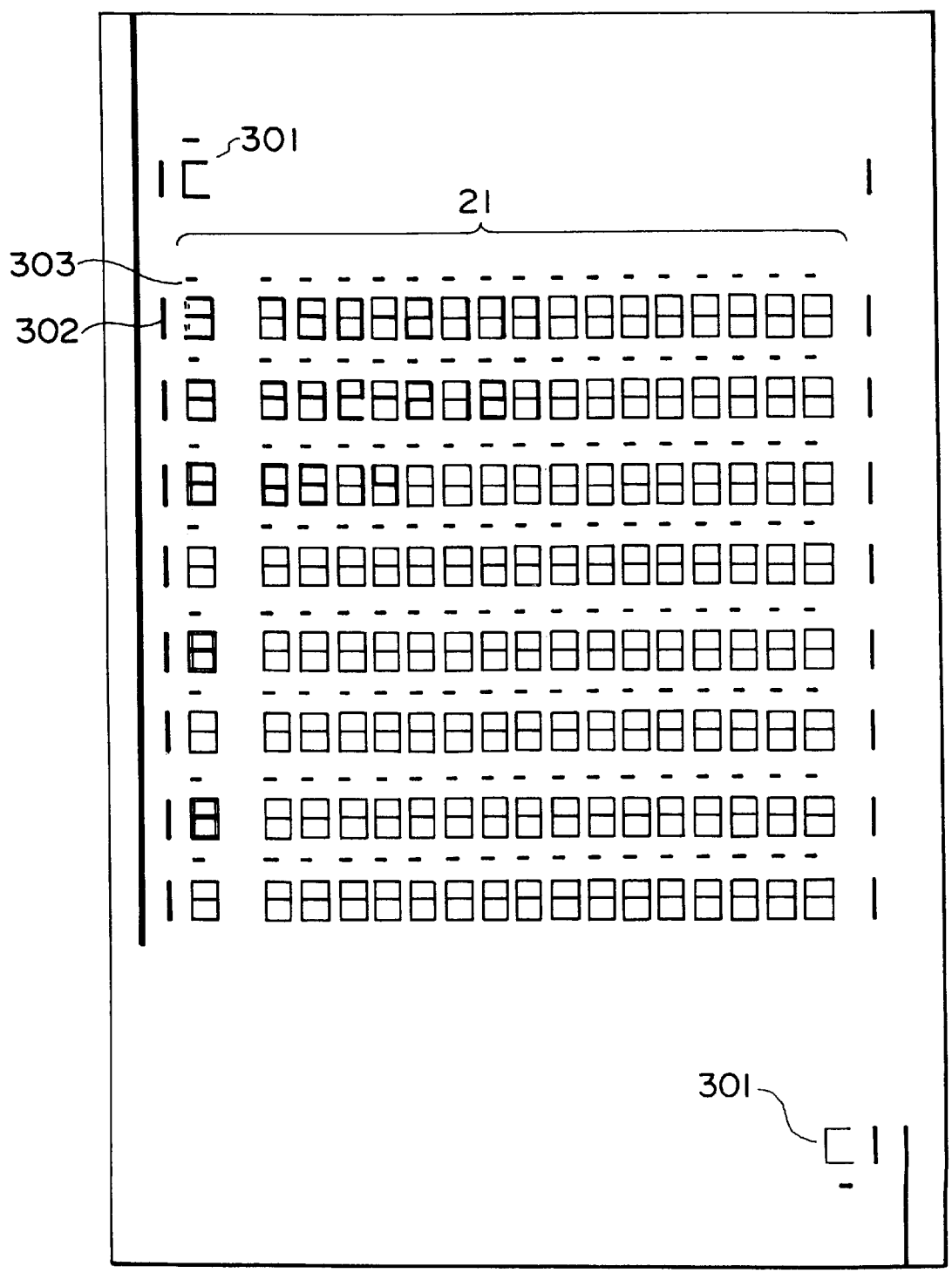
FIG. 2 is a diagram showing an example of an OCR sheet format.

If the image quality lies within a reference decision range, the CPU 1 activates the OCR recognition section 8. The OCR recognition section 8 discriminates whether the decoded received document is the normal document or the OCR document. In the embodiment, if a special pattern as shown in FIG. 2 exists at a predetermined position on the document, this document is determined to be the OCR document. If it is decided that the received document is the OCR document, the pattern recognition process is executed and the result of the pattern recognition is informed to the CPU 1.

Next, on the basis of the result of the recognition of the OCR recognition section 8, the CPU 1 indicates to send a normal reception/abnormal reception signal to the network controller 10 and transfers the decoded received document to the printer 7 to print it.

[Description of the Processing Procedure (FIG. 3)]

Figure 3:
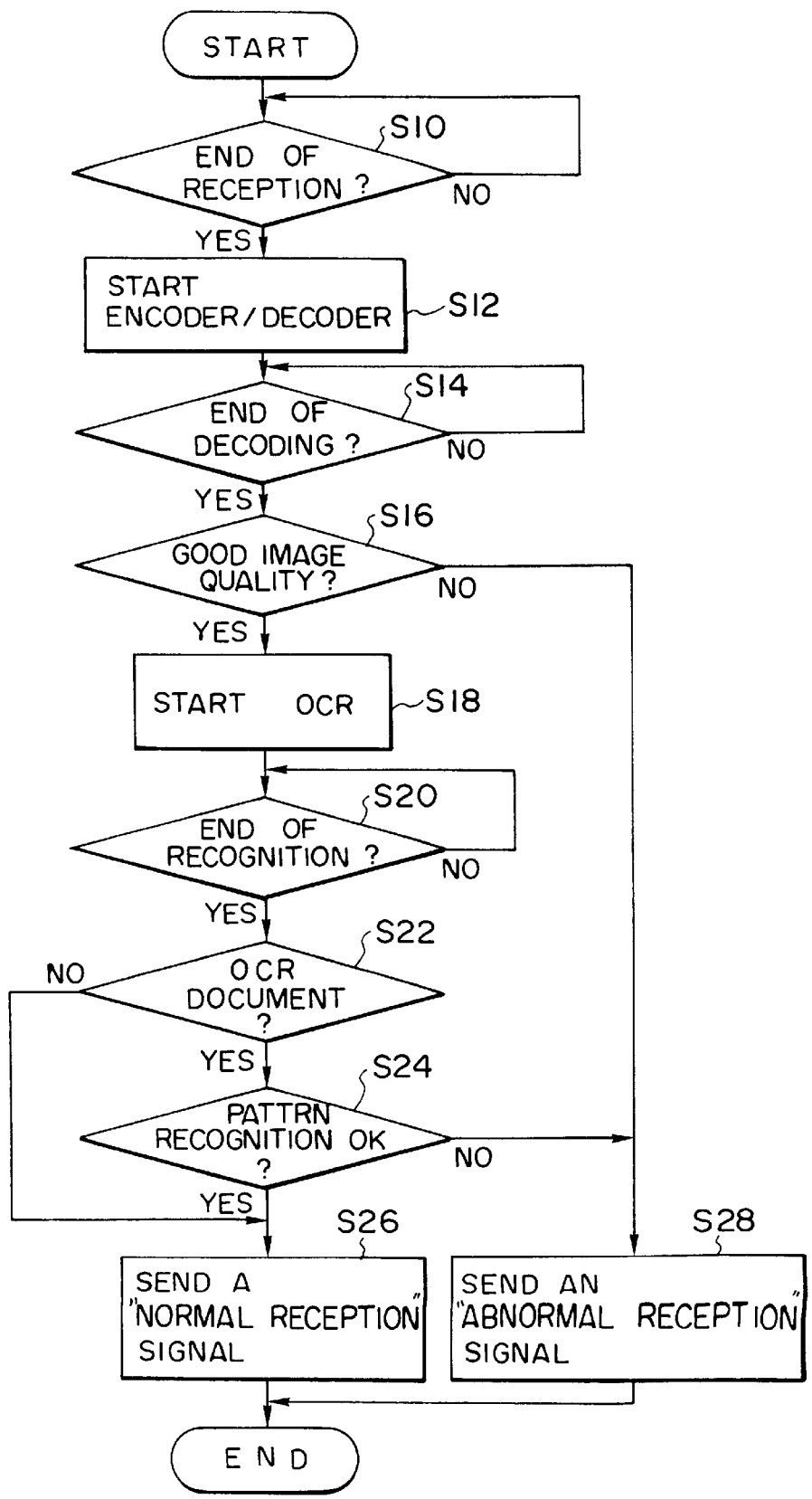
FIGS. 3 and 4 are flowcharts showing processing procedures in the embodiment.

The processing procedure according to the embodiment in the case of receiving image data from the distant side facsimile apparatus will now be described with reference to a flowchart of FIG. 3.

First, in step S10, the CPU 1 is set in the mode to wait for the reception of the document image from the distant side facsimile apparatus. When the end of reception is informed from the network controller 10, step S12 follows. In step S12, the encoder/decoder 9 is made operative to decode the encoded image data which was received by the network controller 10. In step S14, a check is made to see if the decoding has been finished or not. Next, when the end of decoding is informed from the encoder/decoder 9, step S16 follows. In step S16, the image quality is discriminated. If the image quality lies within a reference decision range, step S18 follows and the OCR recognition section 8 is made operative. In step S20, a check is made to see if the end of recognition has been informed from the OCR recognition section 8 or not. On the contrary, if the image quality exceeds the reference decision range, step S28 follows.

The OCR recognition section 8 activated by the CPU 1 discriminates the normal document and the OCR document and executes the pattern recognizing process in the case of the OCR document. At this time, if even one character cannot be recognized as the result of the recognition, the unrecognizable state is informed to the CPU 1.

In the next step S22, the result of the discrimination from the OCR recognition section 8 is discriminated and in the case of the normal document, the processing routine advances to step S26. However, in the case of the OCR document, step S24 follows and the result of the pattern recognition from the OCR recognition section 8 is discriminated. If the result indicates the recognizable state, step S26 follows and a normal reception signal is sent to the network controller 10. If the result denotes the unrecognizable state in step S24, an abnormal reception signal is sent in step S28.

As mentioned above, according to the embodiment, only when the pattern of the OCR document received from the distant side terminal could completely be recognized, the normal reception signal is sent to the transmitting side, so that a confusion between the transmission and reception is prevented.

As described above, according to the invention, when the document received from the distant side terminal cannot be recognized, by sending the abnormal reception signal to the distant side terminal, the document image data can be again received and there is an advantage such that the communication can be promptly executed without a vain between the transmitting side and the receiving side.

Figure 4:
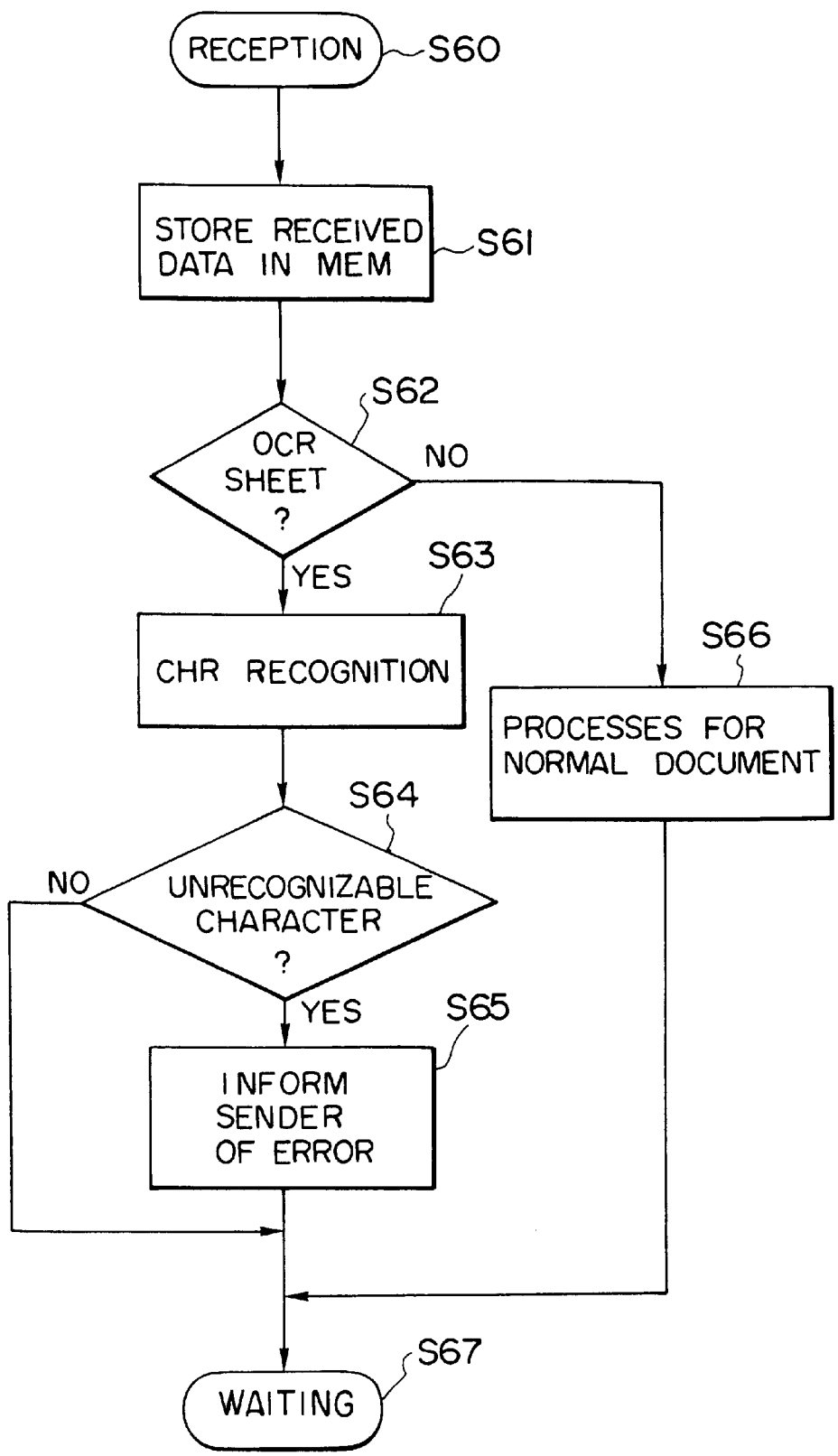

The above-described communicating processes will be summarized as shown in a flowchart of FIG. 4. When a signal has been received in step S60, the image data from the distant side terminal is received and stored into a memory in step S61. In step S62, a check is made to see if the stored image data is the image data obtained by reading the normal document or OCR sheet. In the case of the normal document, the processes for the normal document are executed in step S66. In the case of the OCR sheet, step S63 follows and characters are recognized on the basis of the OCR pattern and step S64 then follows. In step S64, a check is made to see if an unrecognizable character exists or not. If an unrecognizable character exists, the existance of the unrecognizable character is informed to the transmitting side terminal in step S65.

II. A further improved embodiment of the embodiment in the above item I will now be described. In the above embodiment, the image input section and the transmitting side terminal cannot know the erroneous writing position to the OCR sheet or the position where the unrecognizable character exists. There is considered a problem such that it takes a long time to correct or detect the unrecognizable characters.

In the embodiment, when an unrecognizable character is detected, the position of this character and the result of the recognition are output together with the document image. Thus, the erroneous writing position or the unrecognizable character position on the document can be easily known.

[Description of the Communicating Terminal (FIGS. 1 and 2)]

Figure 5:
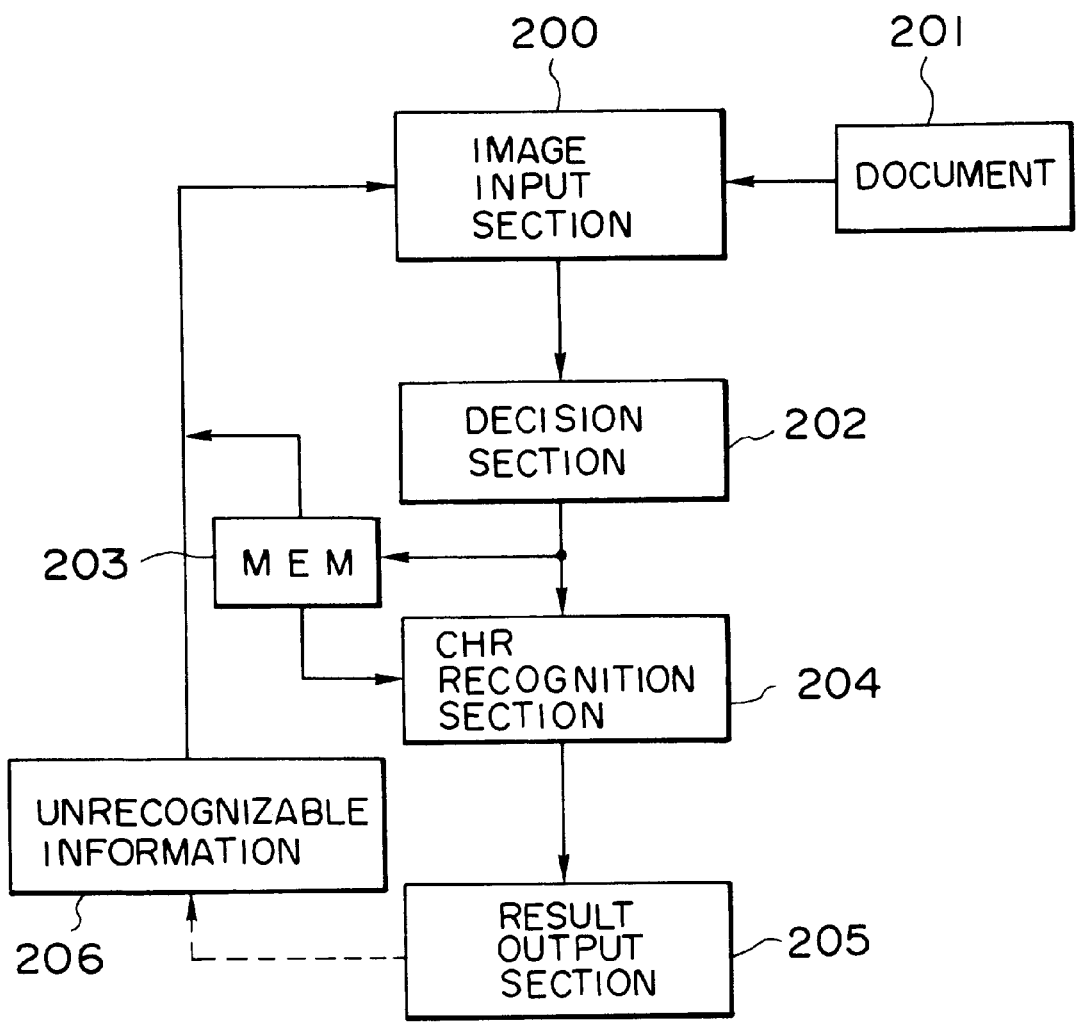
FIG. 5 is a functional block diagram according to another embodiment.

FIG. 5 is a functional block diagram of the character recognition device in the embodiment.

Reference numeral 200 denotes an image input section for optically reading a document image 201 and inputting and for outputting image data. The image input section 200 is arranged at a position away from the device. A communicating terminal to transmit data in an image data format to the character recognition device may be also used in place of the image input section 200. Reference numeral 202 denotes a decision section to decide whether the input image data is the OCR data or not. Such a decision is made by discriminating whether the input image data is the data obtained by reading the OCR sheet format or not on the basis of a mark 301 or the like written at a predetermined position on the OCR sheet as shown in, for instance FIG. 2. Reference numeral 203 denotes a memory to store the image data transmitted through the decision section 202. Reference numeral 204 indicates a character recognition section for receiving the result of the decision from the decision section 202 and the image data stored in the memory 203 and for recognizing the characters.

Reference numeral 205 denotes a recognition result output section to output the result of the character recognition. The recognized characters and the like are output as code data. If an unrecognizable character exists in the image data stored in the memory 203, the position information is derived on the basis of marks 302, 303, and the like shown in FIG. 2. The unrecognizable character is stored into the memory (RAM 103) as unrecognizable information 206 including the position information and is further output. The unrecognizable information 206 and the input image data of the memory 203 are made correspond and returned to the image input section 200, respectively. Thus, the image input section 200 can confirm the unrecognizable character in the output image data and its existence position. Such a confirmation can be accomplished by changing the output format of the portion and visualizing it on the display screen or by printing out it.

Figure 6:
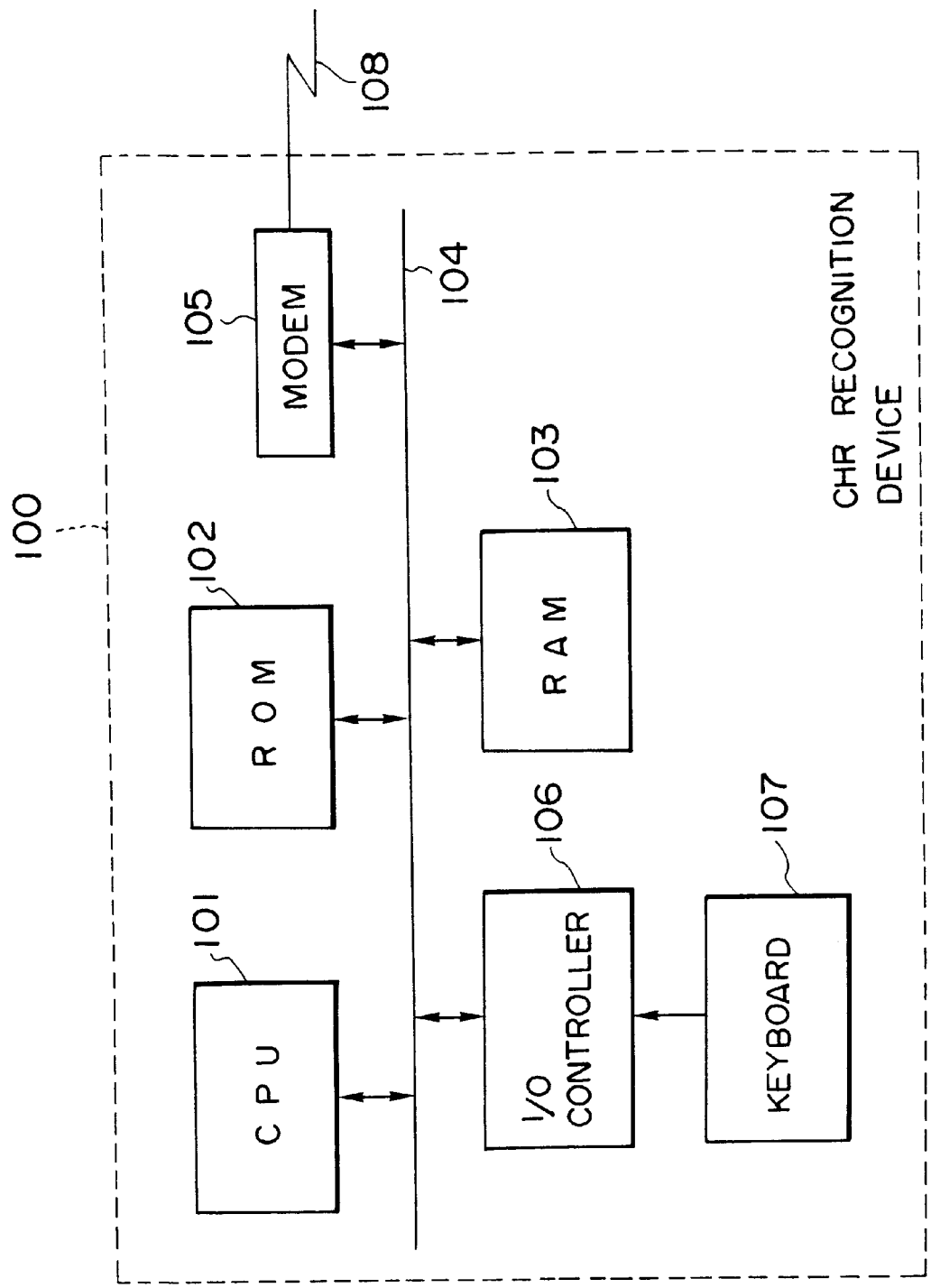
FIG. 6 is a diagram showing a schematic construction of a character recognition device in another embodiment.

FIG. 6 is a block diagram showing a schematic construction of the character recognition device of the embodiment. A communicating terminal in the embodiment is connected to a telephone line network. The character recognition device which can transmit and receive the image data will be described as an example.

In the diagram, reference numeral 100 denotes a character recognition device in the embodiment; 101 indicates a CPU to control the whole device 100 in accordance with a control program stored in an ROM 102, various kinds of data, and the like; and 103 is the RAM which is used as a work area of the CPU 101 and stores the image data and the like input from a modem 105, a keyboard 107, and the like, which will be explained hereinbelow. Reference numeral 105 denotes the modem to control the input and output between a public line 108 and the device 100. The modem 105 converts a digital signal into an AC signal and outputs to the line 108. The modem 105 also converts an AC signal of the line 108 into a digital signal and inputs to the device 100. Reference numeral 107 denotes the keyboard which is operated by an operator and inputs various kinds of data. The data input by the keyboard 107 is input to a system bus 104 through an I/O controller 106.

FIG. 2 is a diagram showing an example of an OCR sheet format. A character (numeral) train written by the hand into a writing area 21 on a sheet is read and recognized. Reference numeral 301 denotes the mark indicative of the OCR sheet and 302 and 303 indicate the marks to indicate positions. In the example shown in FIG. 2, the character train which is written by the hand is a numeral train having a construction similar to that of a 7-segment display.

[Description of the Operation]

Figure 7:
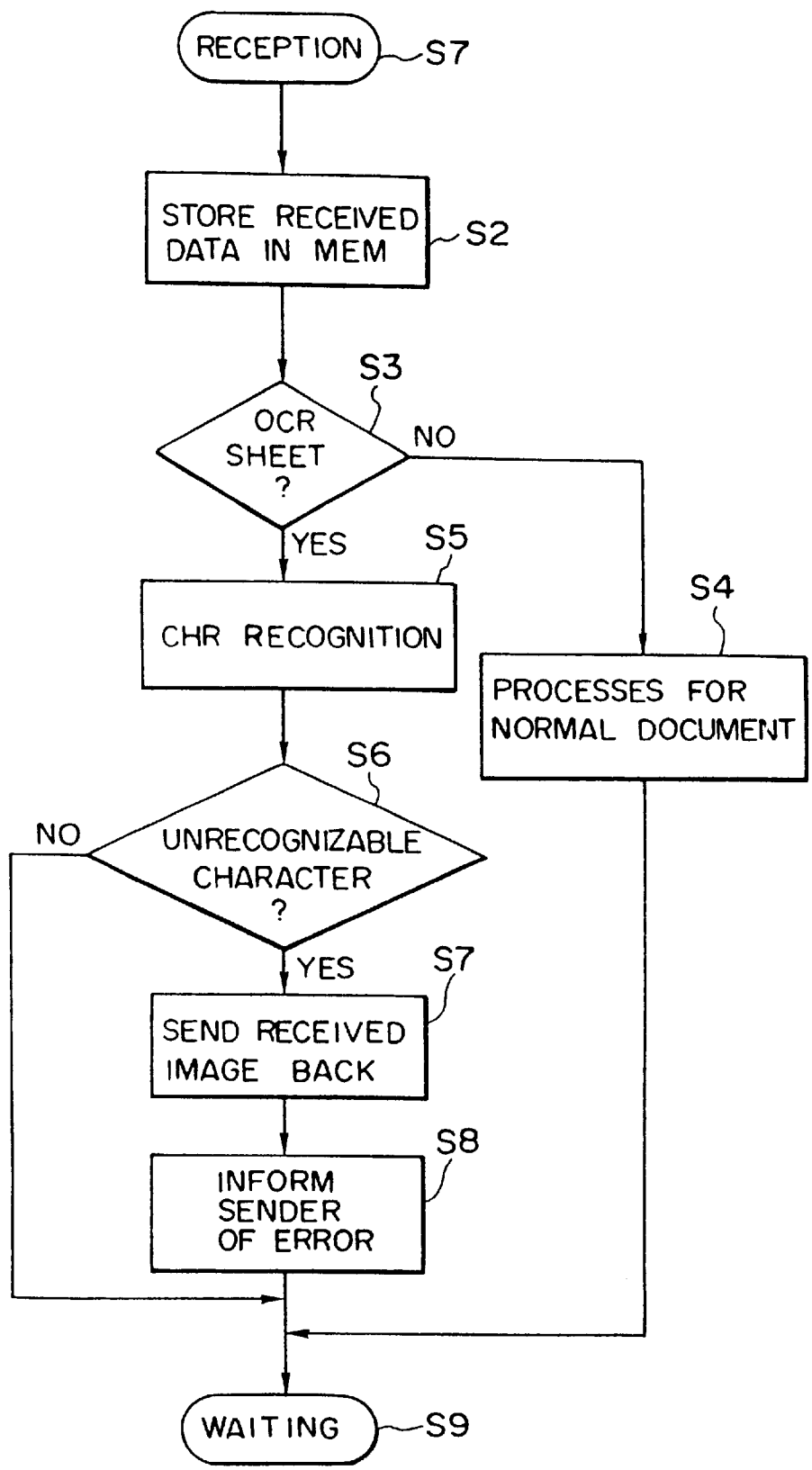
FIG. 7 is a flowchart showing the recognizing process.

FIG. 7 is a flowchart showing the character recognizing operation by the CPU 101 in the character recognition device according to the embodiment. A control program to execute the control shown by the flowchart is stored in the ROM 102.

When a signal has been received in step S1, in step S2, an image signal input through the subscriber's line (public line) 108 of a telephone network is converted by the modem 105 and, thereafter, it is input through the system bus 104 and stored into a data memory in the RAM 103. In step S3, on the basis of the image data stored in the RAM 103, a check is made to see if the input image data is the image data obtained by reading the OCR sheet as shown in FIG. 2 or not. For instance, such a discrimination can be made by checking the presence or absence of the mark 301. If the image data is not the image data from the OCR sheet, step S4 follows and the image processes for the normal image data are executed.

In step S3, if the image data is not the image data read from the OCR sheet, step S5 follows and characters are recognized on the basis of the image data stored in the RAM 103. In step S6, a check is made to see if an unrecognizable character exists or not. If an unrecognizable character exists, step S7 follows and the received image stored in the RAM 103 is output to the communication line 108 through the modem 105 and returned to the communicating terminal on the transmitting side which has transmitted the image data. In step S8, the position data (derived on the basis of the marks 302 and 303 and stored in the RAM 103) indicative of the unrecognizable character portion, the result of the recognition of the whole OCR sheet, or the like is informed to the communicating terminal on the transmitting side. In step S9, the apparatus is set into the waiting mode and the processes are finished.

In the embodiment, when an unrecognizable character exists, the position of the unrecognizable character, the result of the recognition, or the like has been output to the transmitting side terminal which has transmitted the image data. However, it is also possible to construct in a manner such that a display or the like is provided for the receiving side terminal, the position data indicative of the unrecognizable portion, the result of the recognition, or the like is displayed and informed to the operator, and thereby allowing the operator to make a decision with respect to the subsequent procedure.

On the other hand, although the embodiment has been described with respect to the case of the communicating terminal, the invention is not limited to such a case but can be also applied to the case of an off-line character recognition device.

Further, as a transmitting side terminal for transmitting the image data or the like in the embodiment, it is also possible to use a communicating apparatus as in the embodiment or an image input device having a scanner or the like. In such a case, it is desirable that the image input device has a display section such as a display to display the image data or the like and can display the unrecognizable position indicated by the recognition device, the result of the recognition, or the like.

As described above, according to the embodiment, when an unrecognizable character is detected by the character recognition device on the receiving side which has received the image data, the position of the unrecognizable character, the result of the recognition, and the input image data are returned to the transmitting side. Thus, there is an advantage such that the time which is required to detect or correct the erroneous writing portion on the transmitting side terminal arranged at a position away from the receiving side (character recognition section) can be reduced and the load of the operator is reduced.

As described above, according to the invention, the character recognition of the image data indicative of the character information is executed and when the presence of an unrecognizable character is detected, the result of the recognition, the position of the unrecognizable character, and the like are transferred to the output side together with the image data. Thus, there there is an advantage such that the unrecognizable character position can be easily decided in the image input section.

What is claimed is:

1. A communicating apparatus comprising:

receiving means for receiving image information from a distant-side terminal via a public line;

determining means for determining whether the image information received by said receiving means is unsatisfactory for character recognition;

recognizing means for recognizing each character image included in the received image information in the case that the received image information is determined to be satisfactory for character recognition by said determining means, said recognizing means not performing character recognition processing in the case that the received image information is determined to be unsatisfactory for character recognition by said determining means; and transmitting means for transmitting unrecognized character images included in the received image information to the distant-side terminal via the public line.

2. An apparatus according to claim 1, wherein said recognizing means discriminates whether said received image information is the information obtained from an OCR sheet or not.

3. An apparatus according to claim 2, further comprising control means for controlling whether the recognition by said recognizing means is stopped or not in the case where it is decided that the image information is not the information obtained from the OCR sheet on the basis of the result of said discrimination.

4. An apparatus according to claim 1, wherein transmitting the received image information represents a request for retransmission of the image information.

5. An apparatus according to claim 1, wherein said transmitting means transmits the received image information when the received image information includes at least one character which cannot be recognized.

6. An apparatus according to claim 1, wherein said transmitting means transmits to the distant-side terminal a signal indicating that the received image information is not satisfactory, in accordance with the determination by said determining means.

7. An apparatus according to claim 1, further comprising an image reading for reading the received image information.

8. A communicating apparatus comprising:
   receiving means for receiving document image data from a sender via a public line;
   determining means for determining whether the document image data received by said receiving means is unsatisfactory for character recognition;
   recognizing means for recognizing each character image included in the received document image data in the case that the received document image data is determined to be satisfactory for character recognition by said determining means, said recognizing means not performing character recognition processing in the case that the received document image data is determined to be unsatisfactory for character recognition by said determining means; and
   returning means for returning to the sender, via the public line, recognition result information and position information indicating a position of an unrecognized character image.

9. An apparatus according to claim 8, wherein said recognizing means discriminates whether said received image information is the information obtained from an OCR sheet or not.

10. An apparatus according to claim 9, further comprising control means for controlling whether the recognition by said recognizing means is stopped or not in the case where it is decided that the image information is not the information obtained from the OCR sheet on the basis of the result of said discrimination.

11. An apparatus according to claim 8, wherein said returning means returns the recognition result information if the received image data includes at least one unrecognizable character.

12. An apparatus according to claim 8, wherein said returning means returns to the sender a signal indicating that the received document image data is not satisfactory, in accordance with the determination by said determining means.

13. An apparatus according to claim 8, further comprising an image reader for reading the received document image data.

14. A communicating method comprising the steps of:
    receiving image information from a distant-side terminal via a public line;
    determining whether the image information received in said receiving step is unsatisfactory for character recognition;
    recognizing each character image included in the received image information in the case that the received image information is determined to be satisfactory for character recognition in said determining step, said recognizing step not performing character recognition processing in the case that the received image information is determined to be unsatisfactory for character recognition in said determining step; and
    transmitting unrecognized character images included in the received image information to the distant-side terminal via the public line.

15. A method according to claim 14, wherein said recognizing step discriminates whether said received image information is the information obtained from an OCR sheet or not.

16. A method according to claim 15, further comprising a control step for controlling whether the recognition by said recognizing step is stopped or not in the case where it is decided that the image information is not the information obtained from the OCR sheet on the basis of the result of said discrimination.

17. A method according to claim 16, further comprising a step of reading the received OCR image information using an image reader.

18. A method according to claim 15, further comprising a step of reading the received document image data using an image reader.

19. A method according to claim 14, wherein transmitting the received image information represents a request for retransmission of the image information.

20. A method according to claim 19, further comprising a step of reading the received document image data using an image reader.

21. A method according to claim 14, wherein said transmitting step transmits the received image information when the received image information includes at least one character which cannot be recognized.

22. A method according to claim 14, wherein said transmitting step transmits to the distant-side terminal a signal indicating that the received image information is not satisfactory, in accordance with the determination in said determining step.

23. A method according to claim 14, further comprising a step of reading the received image information using an image reader.

24. A communicating method comprising the steps of:
    receiving document image data from a sender via a public line;
    determining whether the document image data received in said receiving step is unsatisfactory for character recognition;
    recognizing each character image included in the received document image data in the case that the received document image data is determined to be satisfactory for character recognition in said determining step, said recognizing step not performing character recognition processing in the case that the received document image data is determined to be unsatisfactory for character recognition in said determining step; and
    returning to the sender, via the public line, recognition result information and position information indicating a position of an unrecognized character image.

25. A method according to claim 24, wherein said recognizing step discriminates whether said received image information is the information obtained from an OCR sheet or not.

26. A method according to claim 25, further comprising a control step for controlling whether the recognition by said recognizing step is stopped or not in the case where it is decided that the image information is not the information obtained from the OCR sheet on the basis of the result of said discrimination.

27. A method according to claim 24, wherein said returning step returns the recognition result information if the received image data includes at least one unrecognizable character.

28. A method according to claim 24, wherein said returning step returns to the sender a signal indicating that the received document image data is not satisfactory, in accordance with the determination in said determining step.

29. A memory medium storing computer-executable process steps, the process comprising:

- a receiving step for receiving image information from a distant-side terminal via a public line;
- a determining step for determining whether the image information received by said receiving step is unsatisfactory for character recognition;
- a recognizing step for recognizing each character image included in the received image information in the case that the received image information is determined to be satisfactory for character recognition by said determining step, said recognizing step not performing character recognition processing in the case that the received image information is determined to be unsatisfactory for character recognition by said determining step; and
- a transmitting step for transmitting unrecognized character images included in the received image information to the distant-side terminal via the public line.

30. A memory medium storing computer-executable process steps, the process comprising:

- a receiving step for receiving document image data from a sender via a public line;
- a determining step for determining whether the document image data received by said receiving step is unsatisfactory for character recognition;
- a recognizing step for recognizing each character image included in the received document image data in the case that the received document image data is determined to be satisfactory for character recognition by said determining step, said recognizing step not performing character recognition processing in the case that the received document image data is determined to be unsatisfactory for character recognition by said determining step; and
- a returning step for returning to the sender, via the public line, recognition result information and position information indicating a position of an unrecognized character image.

* * * * *